(12) United States Patent
Murata et al.

(10) Patent No.: US 11,378,383 B2
(45) Date of Patent: Jul. 5, 2022

(54) PLANT FACILITY APPARATUS RECOGNITION SYSTEM AND PLANT FACILITY APPARATUS RECOGNITION METHOD

(71) Applicant: Hitachi-GE Nuclear Energy, Ltd., Hitachi (JP)

(72) Inventors: Yukihiro Murata, Tokyo (JP); Hiroshi Seki, Tokyo (JP); Yohei Sugimoto, Tokyo (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 280 days.

(21) Appl. No.: 16/605,709

(22) PCT Filed: Apr. 6, 2018

(86) PCT No.: PCT/JP2018/014742
§ 371 (c)(1),
(2) Date: Oct. 16, 2019

(87) PCT Pub. No.: WO2018/193880
PCT Pub. Date: Oct. 25, 2018

(65) Prior Publication Data
US 2020/0124401 A1    Apr. 23, 2020

(30) Foreign Application Priority Data

Apr. 21, 2017 (JP) .............................. JP2017-084173
Aug. 28, 2017 (JP) .............................. JP2017-162996

(51) Int. Cl.
*G01B 11/02* (2006.01)
*G01B 11/08* (2006.01)
(Continued)

(52) U.S. Cl.
CPC ............. *G01B 11/022* (2013.01); *G01B 11/08* (2013.01); *G01B 11/14* (2013.01); *G05D 1/0094* (2013.01);
(Continued)

(58) Field of Classification Search
CPC . G01B 11/022; G01B 11/0814; G06F 16/282; G06F 30/13; G01D 1/0094; G05D 2201/0207
(Continued)

(56) References Cited

U.S. PATENT DOCUMENTS

2015/0302650 A1    10/2015   Abdelmoati et al.

FOREIGN PATENT DOCUMENTS

| JP | 2012-127896 A | 7/2012 |
|---|---|---|
| JP | 2012-146037 A | 8/2012 |

(Continued)

OTHER PUBLICATIONS

English translation of JP 2012146037, Aug. 2012. (Year: 2012).*
(Continued)

*Primary Examiner* — Michael P Nghiem
(74) *Attorney, Agent, or Firm* — Crowell & Moring LLP

(57) ABSTRACT

A plant facility apparatus recognition system is provided, which appropriately recognizes a plant facility apparatus even in a plant facility in which a wireless facility and a marker are not able to be installed even when the shape of the plant facility apparatus is different from or has been changed from design data. The plant facility apparatus recognition system that uses a mobile device having a camera to recognize the plant facility apparatus to be subjected to work in the plant facility includes a characteristic length acquirer that acquires information on the pipe as a first characteristic length from an image obtained by causing the camera to image the plant facility apparatus and the pipe (Continued)

existing near the plant facility apparatus, and a characteristic length comparator that compares the first characteristic length with a second characteristic length acquired from the design data and related to the pipe.

11 Claims, 10 Drawing Sheets

(51) Int. Cl.
    *G01B 11/14*     (2006.01)
    *G01D 1/00*     (2006.01)
    *G06F 16/28*     (2019.01)
    *G06F 30/13*     (2020.01)
    *G05D 1/00*     (2006.01)

(52) U.S. Cl.
    CPC ............ *G06F 16/283* (2019.01); *G06F 30/13* (2020.01); *G05D 2201/0207* (2013.01)

(58) Field of Classification Search
    USPC ........................................................ 702/158
    See application file for complete search history.

(56) References Cited

FOREIGN PATENT DOCUMENTS

| | | |
|---|---|---|
| JP | 2016-99644 A | 5/2016 |
| JP | 2016-170060 A | 9/2016 |
| KR | 20000041643 A * | 7/2000 |
| KR | 100287967 B1 * | 11/2002 |

OTHER PUBLICATIONS

English translation of KR 20000041643, Jul. 2000. (Year: 2000).*
International Search Report (PCT/ISA/210) issued in PCT Application No. PCT/JP2018/014742 dated Jun. 26, 2018 with English translation (four (4) pages).
Japanese-language Written Opinion (PCT/ISA/237) issued in PCT Application No. PCT/JP2018/014742 dated Jun. 26, 2018 (three (3) pages).

* cited by examiner

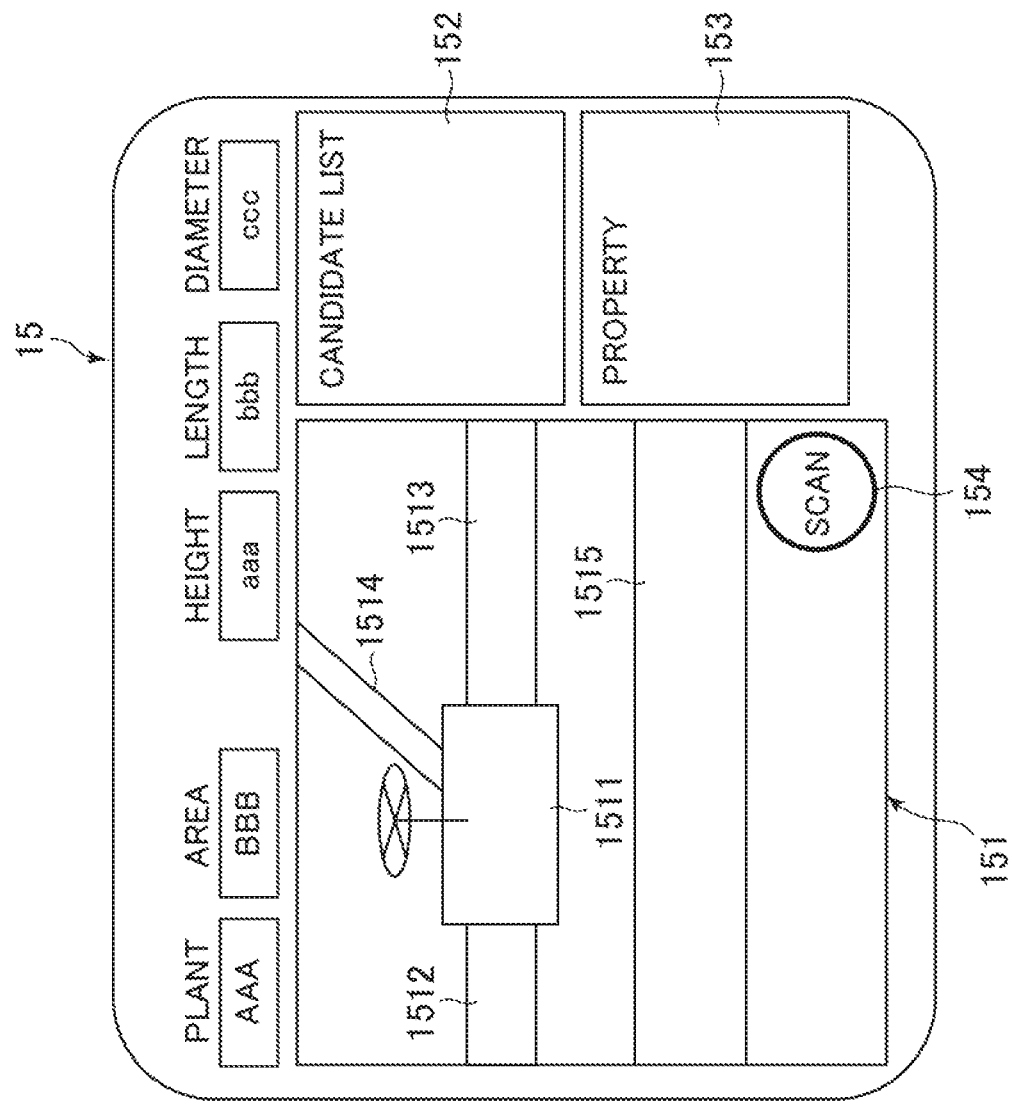

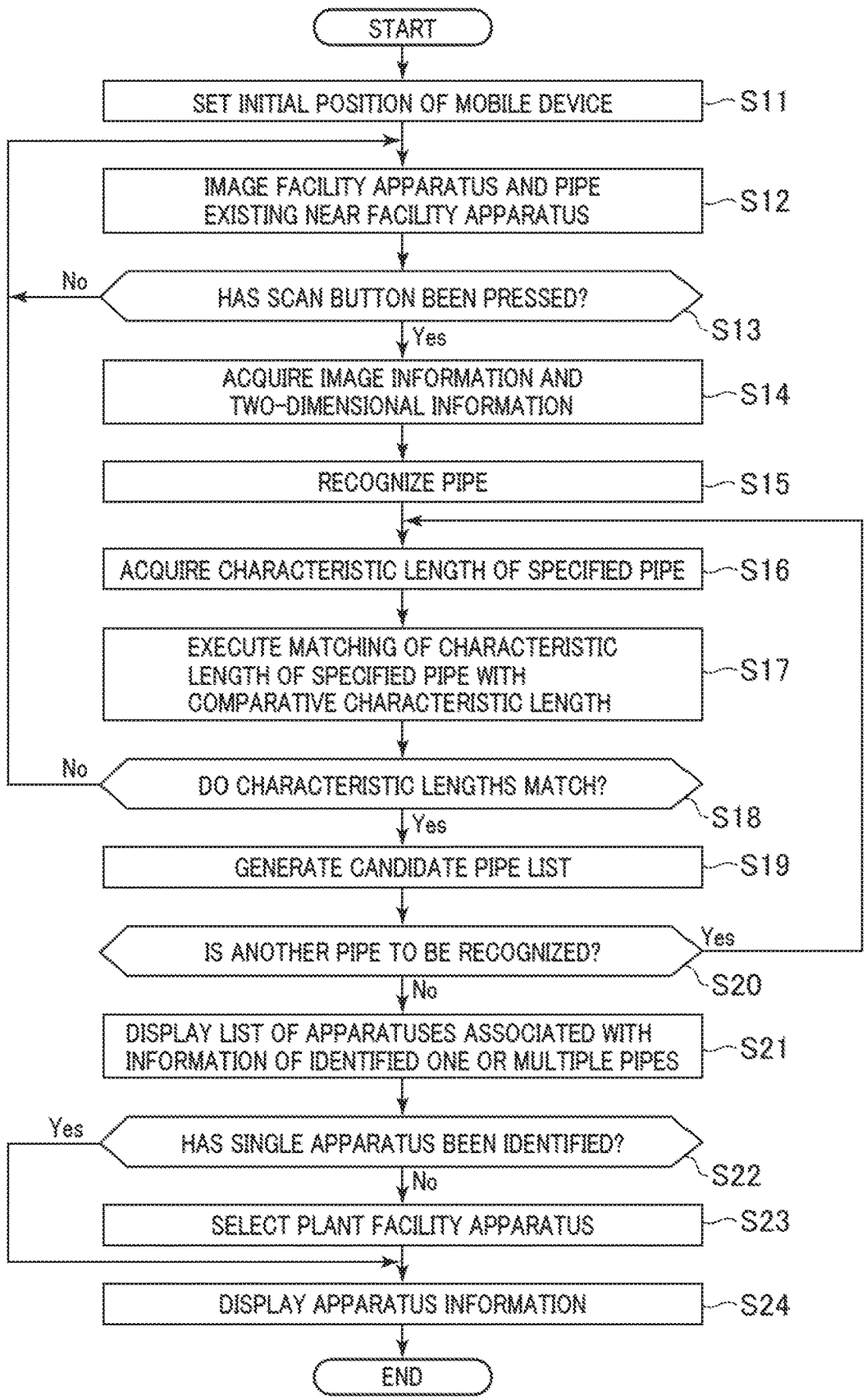

FIG. 8A

|  | PIPE DIAMETER | | PIPE LENGTH | | PIPE HEIGHT | | H/V | |
|---|---|---|---|---|---|---|---|---|
| #1 | ✓ | 60 | ✓ | 260 | | | ✓ | |

FIG. 8B

|  | PIPE DIAMETER | | PIPE LENGTH | | PIPE HEIGHT | | H/V | |
|---|---|---|---|---|---|---|---|---|
| #1 | ✓ | 60 | ✓ | 260 | | | ✓ | |
| #1sq1 | ✓ | 80 | | 200 | | | | ✓ |
| #1sq2 | ✓ | 80 | ✓ | 160 | | 30 | ✓ | |

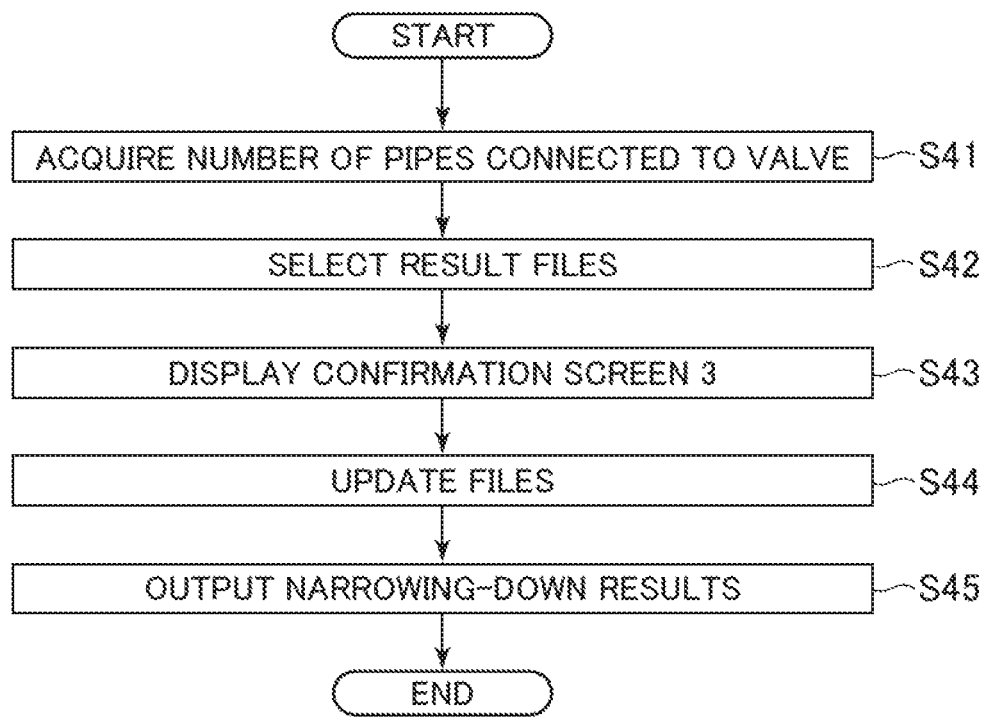

PLANT FACILITY APPARATUS RECOGNITION SYSTEM AND PLANT FACILITY APPARATUS RECOGNITION METHOD

BACKGROUND

The present invention relates to a plant facility apparatus recognition system and a plant facility apparatus recognition method.

In a plant facility such as a nuclear facility, in work such as tests of plant facility apparatuses such as a motor and a valve before operations and maintenance and management of the plant facility apparatuses after the operations, when specifications and work details of each of the plant facility apparatuses to be subjected to the work are known in advance, it is useful to improve a work efficiency. To improve the work efficiency, it is necessary to recognize the plant facility apparatuses, which are to be subjected to the work, by recognizing installation positions of the plant facility apparatuses and recognizing images of the plant facility apparatuses.

Traditionally, for positional recognition, positioning techniques using a global positioning system (GPS), mobile phone base stations, wireless LAN base stations, and the like are widely used. As a technique for image recognition, a self-localization method for identifying a current position using a marker is known. In addition, a technique for executing image recognition on an object and recognizing the object by executing image matching with a model prepared as data to be compared is known. For example, there is a technique, which uses a camera installed in a mobile body to analyze characteristic lengths within an image and uses a Structure from Motion (SFM) method to compare positions of the mobile body at times in a movement of the mobile body with characteristic lengths calculated by computing relative position relationships with characteristic portions to execute matching (refer to, for example, Japanese Unexamined Patent Application Publication No. 2012-127896).

Japanese Unexamined Patent Application Publication No. 2012-127896 discloses that "multiple actual images captured by an in-vehicle camera at a place close to a point to be referenced are input and characteristic portions are extracted as first characteristic information from the input images, corresponding second characteristic information is read and acquired from a map DB, positions of characteristic portions of the first and second characteristic information are estimated by comparing the characteristic portions of the first and second characteristic information with each other and executing matching on the characteristic portions of the first and second characteristic information, an SFM method is used to calculate relative position relationships between positions of a concerned vehicle at times in a movement of the vehicle and the positions of the characteristic portions, based on the estimated positions, and estimate the current position of the concerned vehicle.".

In addition, there is a technique, which uses an image obtained by executing orthorectification on a captured actual image in extraction of characteristic lengths from the captured image, to execute matching using three-dimensional coordinate data to be compared and recognize an object (refer to, for example, Japanese Unexamined Patent Application Publication No. 2016-170060). Japanese Unexamined Patent Application Publication No. 2016-170060 discloses that "characteristic points are extracted from an ortho-rectified current actual image captured by a camera and three-dimensional coordinate data acquired from a server, and the position of a mobile terminal is estimated by executing matching on the extracted characteristic points.".

SUMMARY

A wireless technique typified by a GPS and a marker are not normally able to be used within a plant facility such as a nuclear facility. Thus, in the plant facility, a traditional self-localization method, in which a wireless technique and a marker are used in many cases, may not be able to be used to recognize a plant facility apparatus. In addition, shapes of plant facility apparatuses are different from or have been changed from computer-aided design (CAD) data obtained at a design stage in many cases. Thus, actual images of the plant facility apparatuses may not match images based on the design data, and thus the plant facility apparatuses may not be appropriately recognized.

The invention aims to provide a plant facility apparatus recognition system and a plant facility apparatus recognition method, which are able to appropriately recognize a plant facility apparatus even in a plant facility in which a wireless facility and a marker are not able to be installed even when the shape of the plant facility apparatus is different from or has been changed from design data.

To solve the aforementioned problems, configurations described in claims are used. The present application includes multiple systems for solving the aforementioned problems. An example of the systems is described below.

A plant facility apparatus recognition system that uses a mobile device having a camera to recognize a plant facility apparatus to be subjected to work in a plant facility includes a characteristic length acquirer that acquires information on a pipe as a first characteristic length from an image obtained by using the camera to image the plant facility apparatus to be subjected to the work and the pipe existing near the plant facility apparatus, and a characteristic length comparator that compares the first characteristic length with a second characteristic length acquired from design data and related to the pipe.

According to the invention, it is possible to appropriately recognize a plant facility apparatus to be subjected to work even in a plant facility in which a wireless facility and a marker are not able to be installed even when the shape of the plant facility apparatus is different from or has been changed from design data (CAD data obtained at a design stage).

BRIEF DESCRIPTION OF THE DRAWINGS

FIG. 2 is a diagram depicting an example of a display screen displayed on a display section of a mobile device.

FIG. 3 is a flowchart depicting the flow of a process of a plant facility apparatus recognition method according to the first embodiment.

FIGS. 8A and 8B are diagrams depicting examples of a displayed confirmation screen in the process of recognizing a pipe.

FIG. 9 is a flowchart depicting the flow of a process of recognizing a valve by the plant facility apparatus recognition system according to the second embodiment.

FIG. 10 is a diagram depicting an example of a displayed confirmation screen in the process of recognizing a valve.

DETAILED DESCRIPTION

Hereinafter, embodiments of the invention are described in detail with reference to the accompanying drawings. The invention is not limited to the embodiments. In the following description and drawings, the same elements or elements having the same function are indicated by the same symbols, and a duplicated description is omitted.

Regarding Plant Facility

In a plant facility such as a nuclear facility, a plant facility apparatus is normally connected to a pipe for the purpose of transporting a fluid such as a liquid, gas, or powder or protecting an electric wiring, a cable, or the like. Examples of the plant facility apparatus are a motor and a valve. In the plant facility, plant facility apparatuses are tested before operations and maintained and managed after the operations.

In the tests before the operations and the maintenance and management after the operations, types of the plant facility apparatuses to be subjected to work may be different, installation positions (installation sites) of plant facility apparatuses of the same type may be different, and specifications and work details of the plant facility apparatuses may be different. Thus, in the tests of the plant facility apparatuses such as the motor and the valve before the operations and the maintenance and management after the operations, it is preferable that the specifications and work details of the plant facility apparatuses be known in advance in order to improve a work efficiency.

To know the specifications and work details of the plant facility apparatuses in advance, it is necessary to recognize the plant facility apparatuses to be subjected to the work by recognizing installation positions of the plant facility apparatuses and recognizing images of the plant facility apparatuses. However, in the plant facility such as a nuclear facility, a wireless technique typified by a GPS and a marker are not able to be used in general. In addition, the shapes of the plant facility apparatuses are different from or have been changed from CAD data obtained at a design stage in many cases.

Hereinafter, embodiments of a system (and a method), which can appropriately recognize a plant facility apparatus to be subjected to work under the aforementioned environment or even in a plant facility in which a wireless facility and a marker are not able to be used even when the shape of the plant facility apparatus is different from or has been changed from CAD data obtained at a design stage, are described.

First Embodiment

Configuration of Plant Facility Apparatus Recognition System

Figure 1:
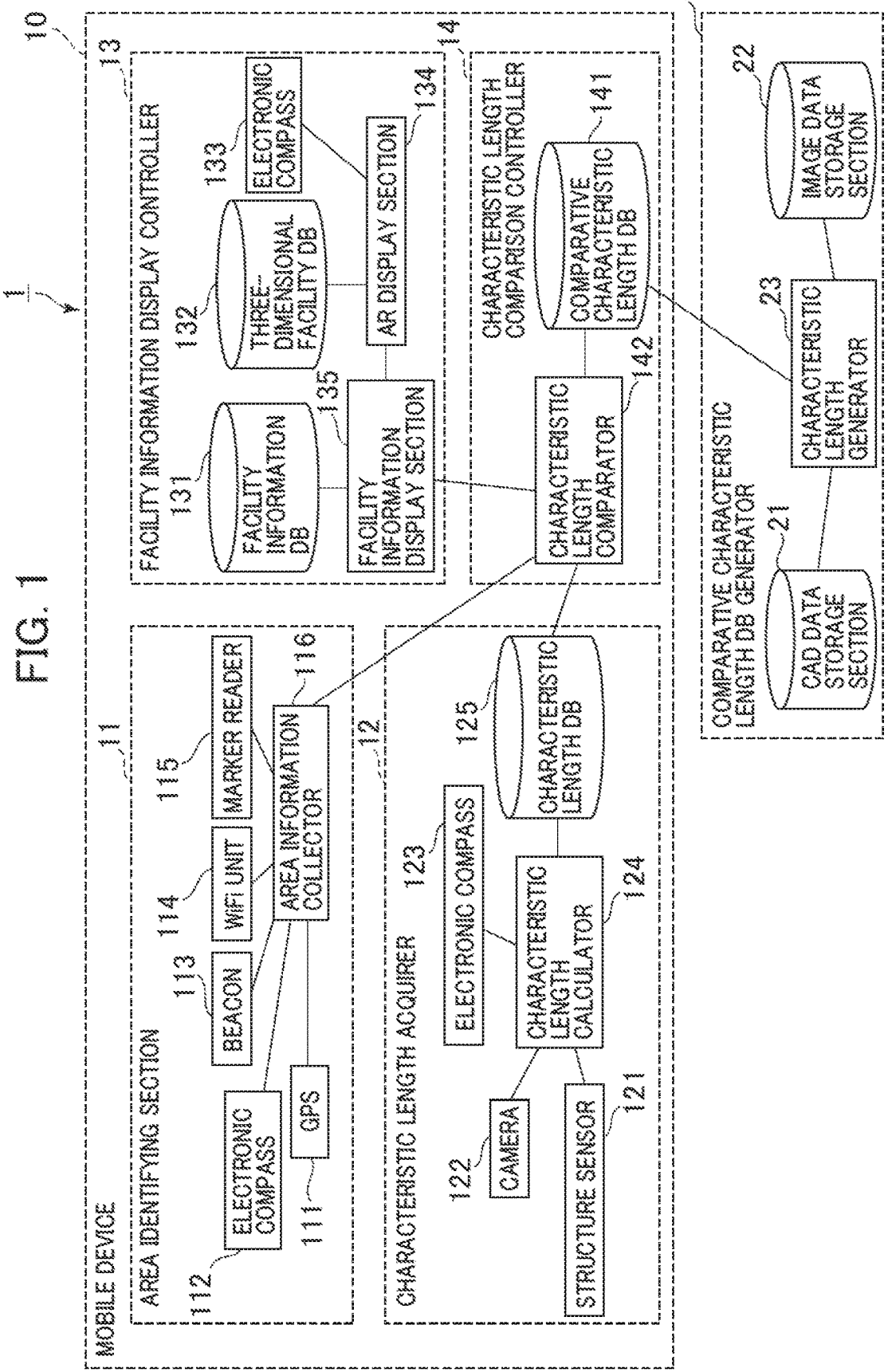
FIG. 1 is a block diagram depicting an example of a configuration of a plant facility apparatus recognition system according to a first embodiment of the invention.

FIG. 1 is a block diagram depicting an example of a configuration of a plant facility apparatus recognition system according to a first embodiment of the invention. The plant facility apparatus recognition system. 1 according to the first embodiment includes a mobile device 10 and a comparative characteristic length database (DB) generator 20 and automatically recognizes a plant facility apparatus to be subjected to work in a test before an operation, and maintenance and management after the operation. The plant facility apparatus to be subjected to the work is also to be recognized. The first embodiment exemplifies the case where the plant facility apparatus to be subjected to the work (and to be recognized) is a valve connected to a pipe for the purpose of transporting a fluid such as a liquid, gas, powder, or the like.

In the mobile device 10, a digital system is built by a microcomputer (microcontroller) including a processor, a memory, and the like. The mobile device 10 includes functional sections, which are an area identifying section 11, a characteristic length acquirer 12, a facility information display controller 13, and a characteristic length comparison controller 14. The functional sections of the mobile device 10 are described later in detail.

The comparative characteristic length database generator 20 includes a CAD data storage section 21, a captured data storage section 22, and a characteristic length generator 23. The CAD data storage section 21 stores and holds CAD data (or design data) obtained at a design stage. An example of the CAD data is three-dimensional design data including a diameter of the pipe within the plant facility, a length of the pipe, and a distance from a floor or a wall to the pipe. The captured data storage section 22 stores and holds image data acquired by a camera 122 (described later) at a plant facility site.

The characteristic length generator 23 uses the data stored in the CAD data storage section 21 and the data stored in the captured data storage section 22 or the CAD data obtained at the design stage and the image data acquired at the plant facility site, to generate (extract) comparative characteristic lengths of the pipe. Examples of the comparative characteristic lengths are the diameter of the pipe, the length of the pipe, a height of the pipe (or the distance from the floor or the wall to the pipe), the orientation (vertical and horizontal orientations) of the pipe, a positional relationship between multiple pipes, and information of the pipe connected to the plant facility apparatus.

Mobile Device

The functional sections of the mobile device 10 or the area identifying section 11, the characteristic length acquirer 12, the facility information display controller 13, and the characteristic length comparison controller 14 are described below in detail.

The area identifying section 11 includes a GPS 111, an electronic compass 112, a beacon 113, a WiFi (registered trademark) unit 114, a marker reader 115, and an area information collector 116. The area identifying section 11 identifies an area that is to be recognized and in which the plant facility apparatus to be subjected to the work (and to be recognized) is installed.

The GPS 111 uses satellite communication to acquire positional information of the mobile device 10. The electronic compass 112 is an example of a compass. The electronic compass 112 detects the geomagnetic field and acquires orientation information of the mobile device 10. The beacon 113 communicates with multiple parent beacons installed in the area to be recognized and acquires positional information of the mobile device 10. The WiFi unit 114 wirelessly connects the mobile device 10 to a local area network (LAN). The marker reader 115 reads multiple markers attached in the area to be recognized in order to identify the position of the mobile device 10.

The area information collector 116 collects various information acquired by the electronic compass 112, the beacon 113, the WiFi (registered trademark) unit 114, and the marker reader 115. The area identifying section 11 acquires, based on the various information collected by the area information collector 116, rough positional information of the mobile device 10 in a region from an entrance of a plant building to the area that is to be recognized and in which the plant facility apparatus to be recognized is installed. The area to be recognized is identified by the area identifying section 11 only in an environment that is not electromagnetically shielded and in which wireless communication is able to be executed.

The characteristic length acquirer 12 includes a structure sensor 121, the camera (imaging device) 122, an electronic compass 123, a characteristic length calculator 124, and a characteristic length database 125. The characteristic length acquirer 12 uses an image captured by the camera 122 and point group data to acquire, as a first characteristic length, information on the pipe. A space within the area to be recognized is normally a space electromagnetically shielded. Thus, after the mobile device 10 is placed in the area to be recognized or under an environment that is electromagnetically shielded and in which wireless communication is not able to be executed, the characteristic length acquirer 12 acquires a characteristic length related to the pipe connected to the plant facility apparatus to be recognized.

The structure sensor 121 is an infrared camera and acquires two-dimensional information of a distance from the mobile device 10 to an object to be imaged. The camera 122 includes a charge coupled device (CCD) image sensor or a complementary metal oxide semiconductor (CMOS) image sensor. The camera 122 images the plant facility apparatus to be recognized and a facility apparatus that includes the pipe connected to the plant facility apparatus and exists in the area to be recognized. The electronic compass 123 detects the geomagnetic field and acquires orientation information of the mobile device 10. The characteristic length calculator 124 calculates, as the first characteristic length, a characteristic length related to the imaged pipe based on information received from the structure sensor 121 and the camera 122. The characteristic length database 125 is a database of a value of the characteristic length calculated by the characteristic length calculator 124 and related to the pipe.

The facility information display controller 13 includes a facility information database 131, a three-dimensional facility database 132, an electronic compass 133, an augmented reality (AR) display section 134, and a facility information display section 135.

The facility information database 131 is a database of facility information including specifications of plant facility apparatuses and a work instruction detail related to the plant facility apparatus to be subjected to the work by a worker. The facility information database 131 presents specifications and work details of the plant facility apparatus recognized. The facility information database 131 may include data associated with positional relationships between the pipe and the plant facility apparatus and structural objects that are included in the plant facility such as, for example, a frame, a product such as an embedded metal item, a temporary material such as scaffolding, a passage, and the like. Thus, a structural object that exists near the mobile device 10 can be estimated.

The three-dimensional database 132 is a database of data equivalent with the CAD data obtained at the design stage and stored in the CAD data storage section 21 or is, for example, a database of three-dimensional data obtained by processing the CAD data. The electronic compass 133 detects the geomagnetic field and the orientation information of the mobile device 10.

The AR display section 134 uses an AR function based on information received from the three-dimensional facility database 132 and the electronic compass 133 to display facility information such as work instruction details of the plant facility apparatuses. The facility information display section 135 displays the facility information such as the work instruction detail of the plant facility apparatus recognized and to be subjected to the work.

The characteristic length comparison controller 14 includes a comparative characteristic length database 141 and a characteristic length comparator 142.

The comparative characteristic length database 141 is a database of a characteristic length generated by the characteristic length generator 23 of the comparative characteristic length database generator 20 or information acquired from the three-dimensional design data (CAD data obtained at the design stage) and related to the pipe as a second characteristic length (comparative characteristic length). The comparative characteristic length database 141 may include, as second characteristic lengths, a diameter of the pipe within the plant facility, a length of the pipe, a distance from the floor or the wall to the pipe, a positional relationship between the plant facility apparatus and the pipe, and a positional relationship between multiple pipes within the plant facility.

The characteristic length comparator 142 compares first characteristic lengths stored in the characteristic length database 125 with second characteristic lengths stored in the comparative characteristic length database 141 and lists a pipe that exists in the area to be recognized and has first and second characteristic lengths matching each other. In the comparison of the first characteristic lengths with the second characteristic lengths, a threshold serving as an index for the matching may be adjusted in the mobile device 10. Since information of the pipe connected to the plant facility apparatus is included in the comparative characteristic length database 141, the plant facility apparatus to be subjected to the work can be indirectly estimated (identified) by identifying multiple pipes.

In the first embodiment, the comparative characteristic length database 141 is enabled in the mobile device 10, but is not limited to this. A comparative characteristic length database generation terminal may be installed separately from the mobile device 10, and the comparative characteristic length database 141 may be enabled in the comparative characteristic length database generation terminal.

Display Screen of Mobile Device

A display screen of the mobile device 10 is described below. FIG. 2 is a diagram depicting an example of the display screen displayed on a display section 15 of the mobile device 10.

The mobile device 10 displays an image captured by the camera 122 installed in the mobile device 10 or a two-dimensional image (two-dimensional information of a distance) acquired by the structure sensor 121 on an image display screen 151 in a central portion of the display section 15. This example exemplifies a state in which pipes 1512 and 1513 between which a valve 1511 is installed, a pipe 1514 branched from the valve 1511, and a pipe 1515 extending in parallel with the pipes 1512 and 1513 are displayed as a two-dimensional image.

The mobile device 10 includes, as the display section 15, a touch panel (touch panel sensor) formed by combining a display device such as a liquid crystal panel or an organic electroluminescent (EL) panel and a position input device such as a touch pad in many cases. A worker may use a finger to touch any of images of the pipes 1512, 1513, 1514, and 1515 on the image display screen 151 of the display section 15 composed of the touch panel to select the desired pipe.

The mobile device 10 may display, in an upper portion of the display section 15, a plant number "AAA" identifying the plant facility and an area number "BBB" identifying the area to be recognized. In addition, the mobile device 10 may display characteristic lengths such as a diameter "aaa", length "bbb", height "ccc", and the like of the pipe selected by the worker. In this case, the characteristic lengths such as the diameter of the pipe, the length of the pipe, and the height of the pipe can be acquired from the CAD data stored and held in the CAD data storage section 21 (refer to FIG. 1) in advance.

The height of the pipe is acquired only when the height of the pipe from the floor can be recognized. An example of the case where the height of the pipe from the floor can be recognized is the case where the pipe and the floor can be imaged simultaneously and two-dimensional information of the distance from the floor to the pipe can be acquired by the structure sensor 121.

In addition, the mobile device 10 can display, as a candidate list display screen 152 on the upper right side of the image display screen 151, a list of candidate pipes or candidate plant facility apparatuses, to which pipes or plant facility apparatuses have been narrowed down by characteristic length comparison by the characteristic length comparator 142 (refer to FIG. 1). Furthermore, the mobile device 10 can display, as a property screen 153, a property of a selected pipe or a property of a selected plant facility apparatus on the lower right side of the image display screen 151.

On the image display screen 151, a SCAN button 154, which instructs the camera 122 to acquire an image or instructs the structure sensor 121 to acquire two-dimensional information of a distance from the mobile device 10 to an object to be imaged, can be displayed. The SCAN button 154 corresponds to a shutter of the imaging device (camera). The image or the two-dimensional information of the distance can be acquired by pressing the SCAN button 154 by the worker. A position where the SCAN button 154 is displayed is not limited to a display position depicted in FIG. 2.

Image of Extraction of Floor, Wall, and Pipe

The two-dimensional information (two-dimensional image) of the distance from the mobile device 10 to the object to be imaged can be obtained by the structure sensor 121 depicted in FIG. 1. The structure sensor 121 radiates infrared light to the object to be imaged and measures the light reflected on the object to be imaged, thereby obtaining the two-dimensional information of the distance. Then, the structure sensor 121 can extract, from the distance information obtained as the two-dimensional information, a planar surface or a curved surface based on the amount of a change in the distance. This enables the floor, the wall, and the pipe to be identified.

As an image processing method, for example, when the planar surface is obtained from the two-dimensional information of the distance, a method for using a point cloud library (PCL) module to extract a group of points of the planar surface and calculate a planar approximation may be used. The PCL module is a library including a collection of open-source 3D point cloud data processes.

In addition, as a distance (distance to a wall) from the wall, a distance from a line of intersection formed between adjacent two walls may be used. Specifically, two planar equations are calculated to obtain the line of intersection, a start point of the pipe and an end point of the pipe are extracted to obtain a linear equation, and a distance between the line of intersection and a line indicated by the linear equation is calculated. As the recognition of a cylindrical pipe, for example, a distance between two boundary lines of a side surface of the cylindrical pipe is calculated to extract the diameter of the pipe. Since the side surface of the cylindrical pipe is a curved surface, it can be recognized that the two boundary lines extend on the side surface of the cylindrical pipe based on a normal vector.

As distances from the pipe to walls, distances between a current position and the walls existing around the current position can be recognized by imaging the walls existing in four directions. Butt portions of the walls of the plant facility are orthogonal to each other in many cases, and a location within the area to be recognized can be estimated from the distances to the walls existing around the current position.

Plant Facility Apparatus Recognition Method

Next, a plant facility apparatus recognition method according to the first embodiment of the invention is described. The plant facility apparatus recognition method according to the first embodiment is executed under control by the processor that builds the digital system of the mobile device 10 in the mobile terminal 10 of the above-configured plant facility apparatus recognition system 1 according to the first embodiment.

FIG. 3 is a flowchart depicting the flow of a process of the plant facility recognition method according to the first embodiment of the invention. FIGS. 4A, 4B, 5A, and 5B are diagrams depicting first and second examples of a display screen of the mobile device 10 in a specific process of the plant facility recognition method according to the first embodiment.

It is assumed that, before the execution of the process of the plant facility apparatus recognition method according to the first embodiment, the comparative characteristic length database generator 20 uses the CAD data obtained at the design stage and the image data acquired at the plant facility site to execute a process of generating comparative characteristic lengths of the pipe connected to the plant facility apparatus to be subjected to the work (and to be recognized). In addition, it is assumed that the comparative characteristic lengths, generated by the comparative characteristic length database generator 20, of the pipe are treated as the comparative characteristic length database 141.

First, the processor uses a function of the area identifying section 11 to set an initial position of the mobile device 10 in order to execute image recognition by characteristic length matching (in step S11). Specifically, the processor uses the function of the area identifying section 11 to identify and set the initial position of the mobile device 11. In this case, the function of the area identifying section 11 is a Graphics Processing Unit (GPU), a WiFi function, a marker, a beacon, or the like and can be used to identify a position. For example, in the case where the plant building is identified from the outside of the plant building, the initial position of the mobile device 10 is to be identified outside the plant building and thus positioning (position identification) can be executed using the GPS.

The aforementioned example exemplifies the method for using the function of the area identifying section 11 to set the initial position of the mobile device 10 under control by the processor, but is not limited to this. For example, in the case where the plant number or the area number is known in advance, a method for manually entering data by the worker to set the initial position of the mobile device 10 may be used.

Figure 4A:
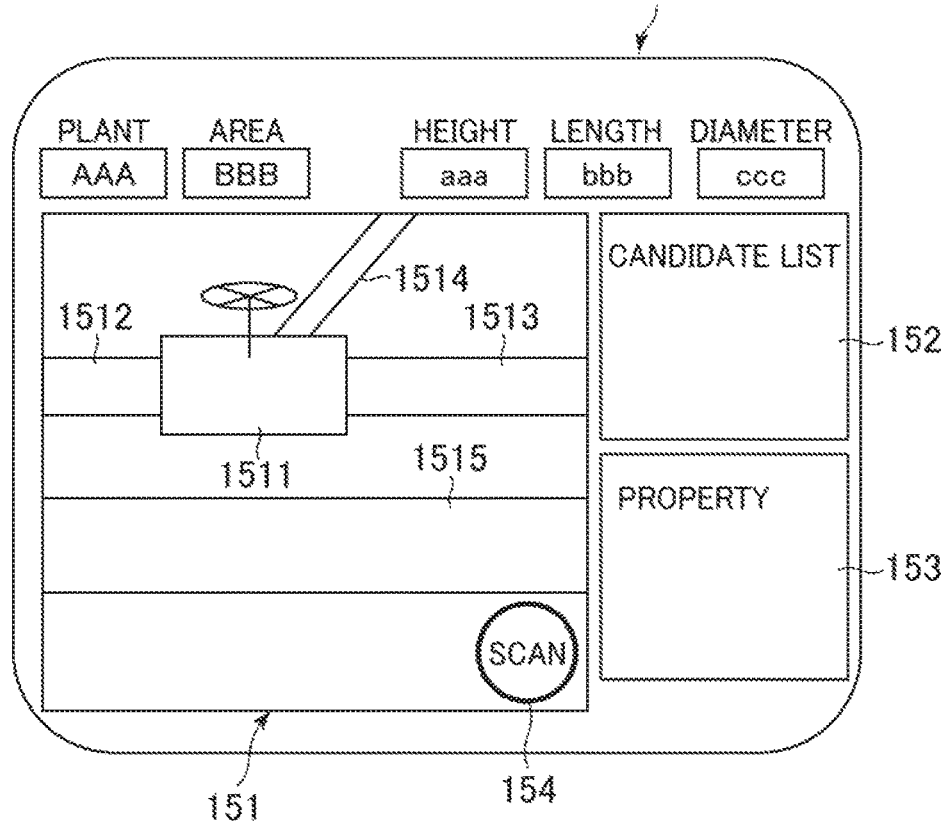
FIGS. 4A and 4B are diagrams depicting a first example of a display screen of the mobile device in a specific process of the plant facility apparatus recognition method according to the first embodiment.

Next, the processor images the plant facility apparatus to be identified (or to be recognized) and the pipe connected to the plant facility apparatus under an operation by the worker (in step S12). Specifically, the processor uses the camera 122 to image the plant facility apparatus and the pipe existing near the plant facility apparatus. FIG. 4A depicts an example of an image obtained by using the camera 122 of the mobile device 10 to image the plant facility apparatus to be identified and the pipe existing near the plant facility apparatus. A display screen depicted in FIG. 4A corresponds to the display screen depicted in FIG. 2. On the image display screen 151, the SCAN button 154 is also displayed.

Next, the processor determines whether the SCAN button 154 displayed on the image display screen 151 has been pressed by the worker (in step S13). When the SCAN button 154 has been pressed (Yes in step S13), the processor acquires image information obtained by the camera 122 and two-dimensional information, obtained by the structure sensor 121, of a distance (in step S14).

Next, the processor recognizes the imaged pipe existing near the plant facility apparatus to be subjected to the work and to be recognized, based on the image information acquired in step S14 and the two-dimensional information, acquired in step S14, of the distance (in step S15). In the recognition process, when multiple pipes existing near the plant facility apparatus to be recognized are imaged, the worker specifies a pipe to be identified on the touch panel and repeatedly performs the recognition operation.

Figure 4B:
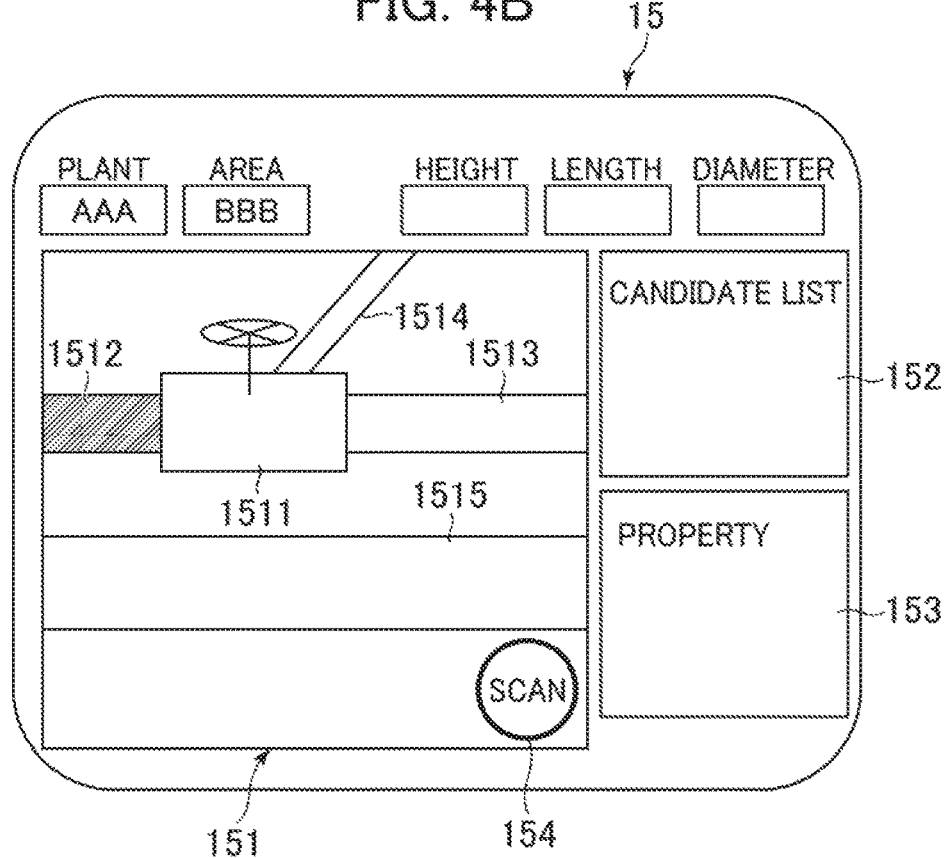

FIG. 4B depicts an image displayed when the single pipe 1512 is selected. In this case, paint (hatching in FIG. 4B) is added to the selected pipe and displayed on the image display screen 151. Thus, the worker can quickly recognize the pipe being confirmed. The diameter of the pipe 1512 is displayed in an upper portion of the display section 15 of the mobile device 10, and attribute information on the pipe 1512 is displayed in a lower right portion of the display section 15.

Next, the processor uses a function of the characteristic length acquirer 12 to acquire a characteristic length of the pipe specified by the worker from the captured image (in step S16). Then, the processor executes matching of the characteristic length acquired from the captured image with a comparative characteristic length acquired in advance and stored in the comparative characteristic length database 141 (in step S17). Subsequently, the processor determines whether the characteristic length calculated from the captured image matches the comparative characteristic length (in step S18). When the characteristic length does not match the comparative characteristic length (No in step S18), the processor causes the process to return to step S12 and repeatedly executes the processes of steps S12 to S18.

Figure 5A:
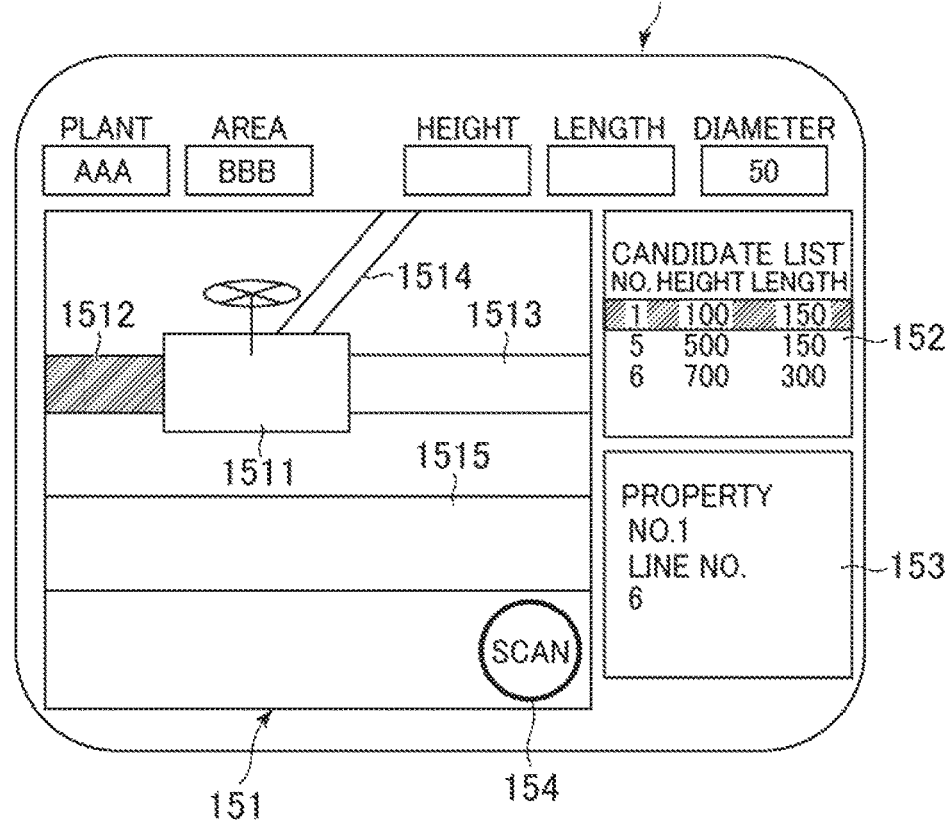
FIGS. 5A and 5B are diagrams depicting a second example of the display screen of the mobile device in the specific process of the plant facility apparatus recognition method according to the first embodiment.

When the characteristic length matches the comparative characteristic length (Yes in step S18), the processor causes a candidate pipe list corresponding to the diameter of the pipe at the current time to be displayed on the candidate list display screen 152 on the right side of the image display screen 151 (in step S19), as depicted in FIG. 5A. Then, the processor determines whether another pipe is to be recognized (in step S20). Whether the other pipe is to be recognized can be determined by determining whether the worker has selected the other pipe on the touch panel.

When pipes connected to the plant facility apparatus are recognized as many as possible, the amount of information to be narrowed down increases and the probability that the plant facility apparatus to be subjected to the work (and to be recognized) can be uniquely identified increases. Thus, when a pipe that exists near the plant facility apparatus is not recognized at this stage, it is preferable that the worker select the pipe on the touch panel again to obtain information of the pipe.

Figure 5B:
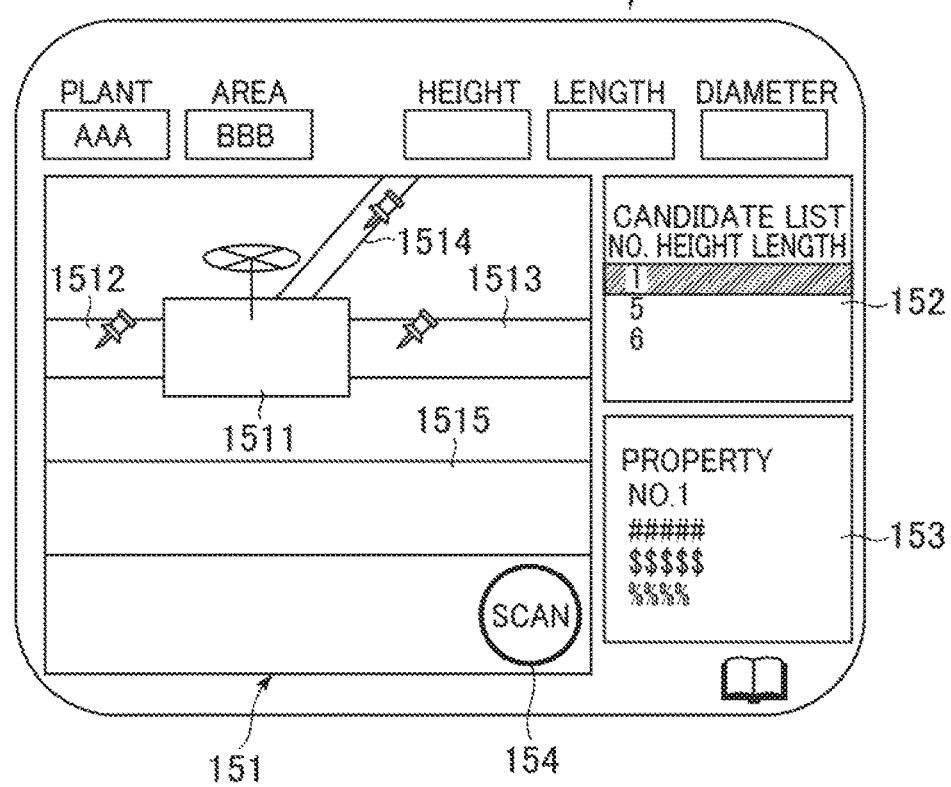

When the worker has selected the other pipe on the touch panel, the processor determines that the other pipe is to be recognized (Yes in step S20), and the processor causes the process to return to step S16 and repeatedly executes the processes of steps S16 to S20. When the worker has not selected the other pipe on the touch panel, the processor determines that the other pipe is not to be recognized (No in step S20) and the processor causes an apparatus list (list of a candidate plant facility apparatus) of an apparatus associated with information of identified one or multiple pipes to be displayed as depicted in FIG. 5B (in step S21).

Next, the processor determines whether the single plant facility apparatus to be subjected to the work (and to be recognized) has been uniquely identified (in step S22). When the single plant facility apparatus has not been uniquely identified (No in step S22), the processor selects a plant facility apparatus based on an operation of touching the touch panel by the worker (in step S23) and displays apparatus information of the selected plant facility apparatus (in step S24).

In the process of displaying the apparatus information, a process of displaying a property of the plant facility apparatus as the apparatus information is executed and a process of displaying a work list related to the plant facility apparatus is executed. Then, when the worker touches and selects a corresponding work item, a work procedure for the plant facility apparatus to be subjected to the work is displayed. When the single plant facility apparatus has been uniquely identified (Yes in step S22), the processor causes the process to directly proceed to step S24 to execute the process of displaying apparatus information of the identified plant facility apparatus.

As described above, in the first embodiment, information on the pipe that exists near the plant facility apparatus to be subjected to the work is acquired as the first characteristic length from an image captured by the camera 122 installed in the mobile device 10. Then, the characteristic length comparator 142 compares the first characteristic length with the second characteristic length acquired from the three-dimensional design data and related to the pipe. Thus, the pipe that exists near the plant facility apparatus to be subjected to the work can be identified based on a result of the comparison by the characteristic length comparator 142, plant facility apparatuses can be narrowed down to the plant facility apparatus based on the identified pipe, and the plant facility apparatus can be recognized (identified or estimated) as the plant facility apparatus to be subjected to the work.

The recognition method according to the first embodiment is different from a method of using an image matching technique to recognize the plant facility apparatus to be subjected to the work. Thus, in the recognition method according to the first embodiment, even when the shape of the plant facility apparatus to be subjected to the work is different from or has been changed from the three-dimensional design data, the plant facility apparatus can be appropriately recognized. In addition, since an image captured by the camera 122 installed in the mobile device 10 is used, the plant facility apparatus to be subjected to the work can be appropriately recognized even in the plant facility in which a wireless facility and a marker are not able to be installed.

In the first embodiment, the information on the pipe is displayed on the facility information display section 135 based on the result of the comparison by the characteristic length comparator 142, and facility information of the plant facility apparatus, which is to be subjected to the work and to which plant facility apparatuses have been narrowed down based on the information on the pipe, is displayed on the facility information display section 135. Then, the specifications and work instruction detail of the plant facility apparatus are displayed on the facility information display section 135 as the facility information of the plant facility apparatus to be subjected to the work. Thus, the worker performs the work based on the specifications and the work instruction detail and it is possible to improve the work efficiency in the test before the operation and the maintenance and management after the operation.

In the first embodiment, characteristic lengths obtained from the three-dimensional design data and to be compared are stored in a specific format in the three-dimensional facility database 132. Thus, the security for data accumulated in the mobile device 10 can be improved.

According to the first embodiment, the positional information of the mobile device 10 can be identified (or estimated) by identifying multiple pipes or plant facility apparatuses that exist near the mobile device 10. Thus, information on a structural object that exists near the mobile device 10 can be displayed on the facility information display section 135 based on the positional information of the mobile device 10. Examples of the structural object existing near the mobile device 10 are a frame, a product such as an embedded metal item, a temporary material such as scaffolding, and a passage.

In an environment in which the electronic compass 133 that is an example of a compass can be used, the orientation of the mobile device 10 can be recognized and thus an image captured by the camera 122 can be estimated from the positional information of the mobile device 10 and the orientation information of the mobile terminal 10. Then, in a state in which the facility information stored in the facility information database 131 is displayed on the AR display section 134, a three-dimensional image stored in the three-dimensional facility database 132 can be superimposed and displayed on the facility information. When the work is performed on the plant facility apparatus, an error in the work can be reduced by superimposing and displaying the work instruction detail on the image captured by the camera 122 using an AR technique.

Second Embodiment

A second embodiment is a modified example of the first embodiment and describes an example in which a pipe connected to a valve includes a bent pipe portion. The valve is an example of a plant facility apparatus to be subjected to work (and to be recognized). The bent pipe portion of the pipe is an L-shaped pipe that is referred to as elbow. The bent pipe portion is a connection fitting pipe that causes the pipe to be branched and joined by connecting straight pipe portions of the pipe to each other. An intra-plant pipe generally includes multiple straight pipe portions and multiple bent pipe portions and is installed so that the pipe is bent and extends in horizontal and vertical directions. An example of the pipe is depicted in FIG. 6.

Figure 6:
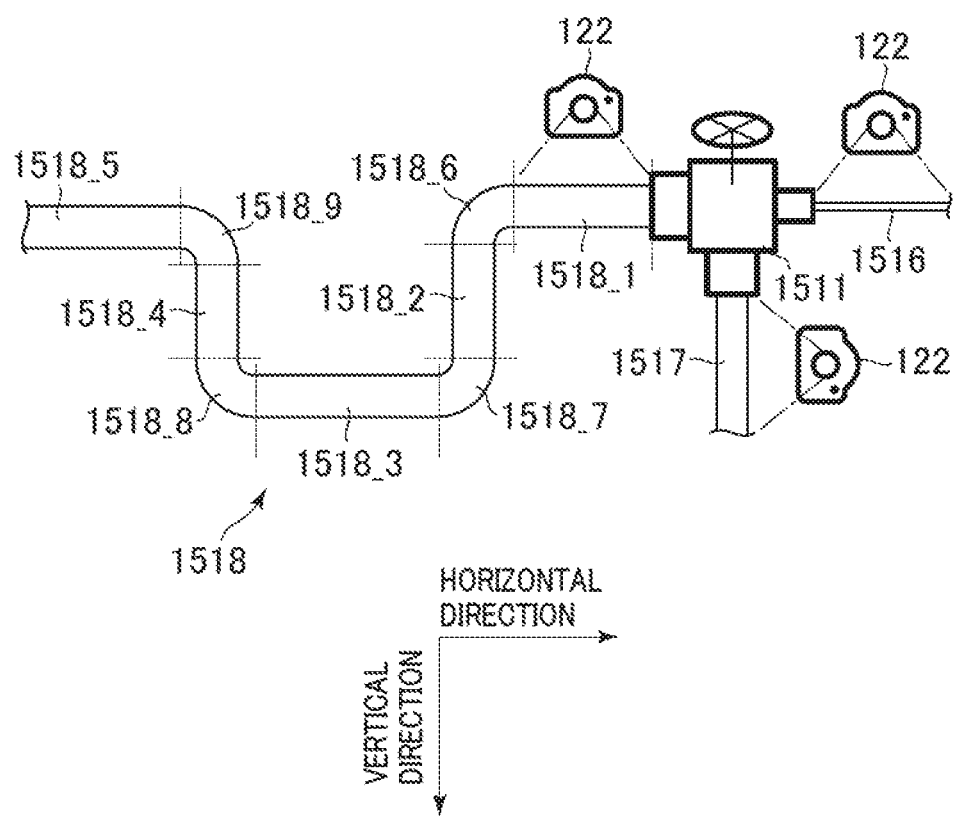
FIG. 6 is a schematic diagram depicting an example of a pipe connected to a valve and including a bent pipe portion (elbow).

FIG. 6 is a schematic diagram depicting the example of the pipe connected to the valve and including the bent pipe portion (elbow). This example indicates a pipe structure with three pipes 1516, 1517, and 1518 connected to the valve 1511. The example exemplifies the case where diameters of the three pipes 1516, 1517, and 1518 are different from each other in the pipe structure. For example, the pipe 1518 includes five straight pipe portions 1518_1, 1518_2, 1518_3, 1518_4, and 1518_5 and four bent pipe portions 1518_6, 1518_7, 1518_8, and 1518_9.

The bent pipe portion 1518_6 connects the straight pipe portion 1518_1 oriented in the horizontal direction to the straight pipe portion 1518_2 oriented in the vertical direction. The bent pipe portion 1518_7 connects the straight pipe portion 1518_2 oriented in the vertical direction to the straight pipe portion 1518_3 oriented in the horizontal direction. The bent pipe portion 1518_8 connects the straight pipe portion 1518_3 oriented in the horizontal direction to the straight pipe portion 1518_4 oriented in the vertical direction. The bent pipe portion 1518_9 connects the straight pipe portion 1518_4 oriented in the vertical direction to the straight pipe portion 1518_5 oriented in the horizontal direction.

FIG. 6 exemplifies the pipe 1518 as a pipe including bent pipe portions (elbows) and depicts a pipe portion of the pipe 1518 viewed from the side of the valve 1511. Each of the pipes 1516 and 1517 may include one or multiple bent pipe portions, like the pipe 1518.

A configuration of a plant facility apparatus recognition system according to the second embodiment is basically the same as the configuration of the plant facility apparatus recognition system illustrated in FIG. 1 according to the first embodiment. In the plant facility apparatus recognition system according to the first embodiment, the three pipes 1512, 1513, and 1514 connected to the valve 1511 are imaged by the camera 122 simultaneously and displayed on the image display screen 151 of the display section 15 (refer to FIG. 2), and the worker selects a desired pipe on the image display screen 151.

However, when any of the multiple pipes connected to the valve is hidden by a temporary material such as scaffolding, or includes multiple straight pipe portions and multiple bent pipe portions as depicted in FIG. 6, it may be difficult for the camera 122 to simultaneously image all the multiple pipes connected to the valve.

In the second embodiment, the multiple pipes connected to the valve are imaged by the camera 122 individually (one by one) as depicted in FIG. 6. Then, every time a single pipe is imaged, the worker performs a process of identifying the pipe in a similar manner to the selection of a desired pipe on the image display screen 151 in the first embodiment, identifies the pipe existing near the valve that is an example of the plant facility apparatus to be subjected to the work. Then, the worker recognizes (identifies or estimates), based on the identified pipe, the valve as the plant facility apparatus to be subjected to the work.

In the second embodiment, when the pipe 1518 including one or multiple bent pipe portions is treated as a pipe to be subjected to the identification process, the individual straight and bent pipe portions are subjected to matching, and the process of identifying the pipe is performed. Specifically, when the pipe to be subjected to the identification process includes the straight pipe portions and the bent pipe portions, not only the straight pipe portion 1518_1 directly connected to the valve 1511 but also the straight pipe portions 1518_2, 1518_3, 1518_4, and 1518_5 and the bent pipe portions

1518_6, 1518_7, 1518_8, and 1518_9 that exist on the downstream side of the pipe portion 1518_1 are subjected to the matching.

In the process of identifying the pipe, pipe information such as diameters, lengths, heights (distances from the floor or the wall to the pipe portions), orientation (vertical and horizontal directions), and the like of the straight and bent pipe portions of the pipe 1518 is stored as comparative characteristic lengths (second characteristic lengths) in the comparative characteristic length database 141. In this case, the characteristic lengths of the straight and bent pipe portions are stored in the database. However, since the diameters and shapes of the bent pipe portions are generally constant, only the characteristic lengths of the straight pipe portions may be stored in the database.

Specifically, in the second embodiment, the camera 122 installed in the mobile device 10 images the pipes 1516, 1517, and 1518 connected to the valve 1511 one by one. The pipe 1518 is described as an example. Like the first embodiment, characteristic lengths of the straight pipe portions 1518_1, 1518_2, 1518_3, 1518_4, and 1518_5 are acquired by the characteristic length acquirer 12 and stored in the characteristic length database 125. Then, the characteristic length comparator 142 crosschecks the multiple straight pipe portions 1518_1, 1518_2, 1518_3, 1518_4, and 1518_5 with the comparative characteristic length database 141, lists candidate pipes having characteristic lengths matching the comparative characteristic length database 141, and causes the candidate pipes to be displayed on the facility information display section 135.

Regarding first characteristic lengths, when a pipe connected to the valve 1511 includes one or multiple bent pipe portions, the CAD data stored in the CAD data storage section 21 is used to separate the pipe into a straight pipe portion and the bent pipe portions. Similarly to the first embodiment, the characteristic length generator 23 uses the CAD data stored in the CAD data storage section 21 to generate first characteristic lengths related to the multiple straight portions 1518_1, 1518_2, 1518_3, 1518_4, and 1518_5 and causes the generated first characteristic lengths to be stored in the comparative characteristic length database 141.

As described above, in the second embodiment, when a pipe to be subjected to the identification process includes one or multiple bent pipe portions, straight pipe portions and bent pipe portions of the pipe are subjected to the matching, and the process of identifying the pipe is performed. Since not only the straight pipe portion 1518_1 directly connected to the valve 1511 but also the straight and bent pipe portions existing on the downstream side of the straight pipe portion 1518_1 are subjected to the matching, the identification rate of the pipe 1518 can be improved, compared with the case where only the straight pipe portion 1518_1 is subjected to the matching.

A process of recognizing a pipe by executing matching on individual straight pipe portions of the pipe and recognizing a valve from the pipe in the plant facility apparatus recognition system according to the second embodiment is described below with reference to FIGS. 7 to 10.

Figure 7:
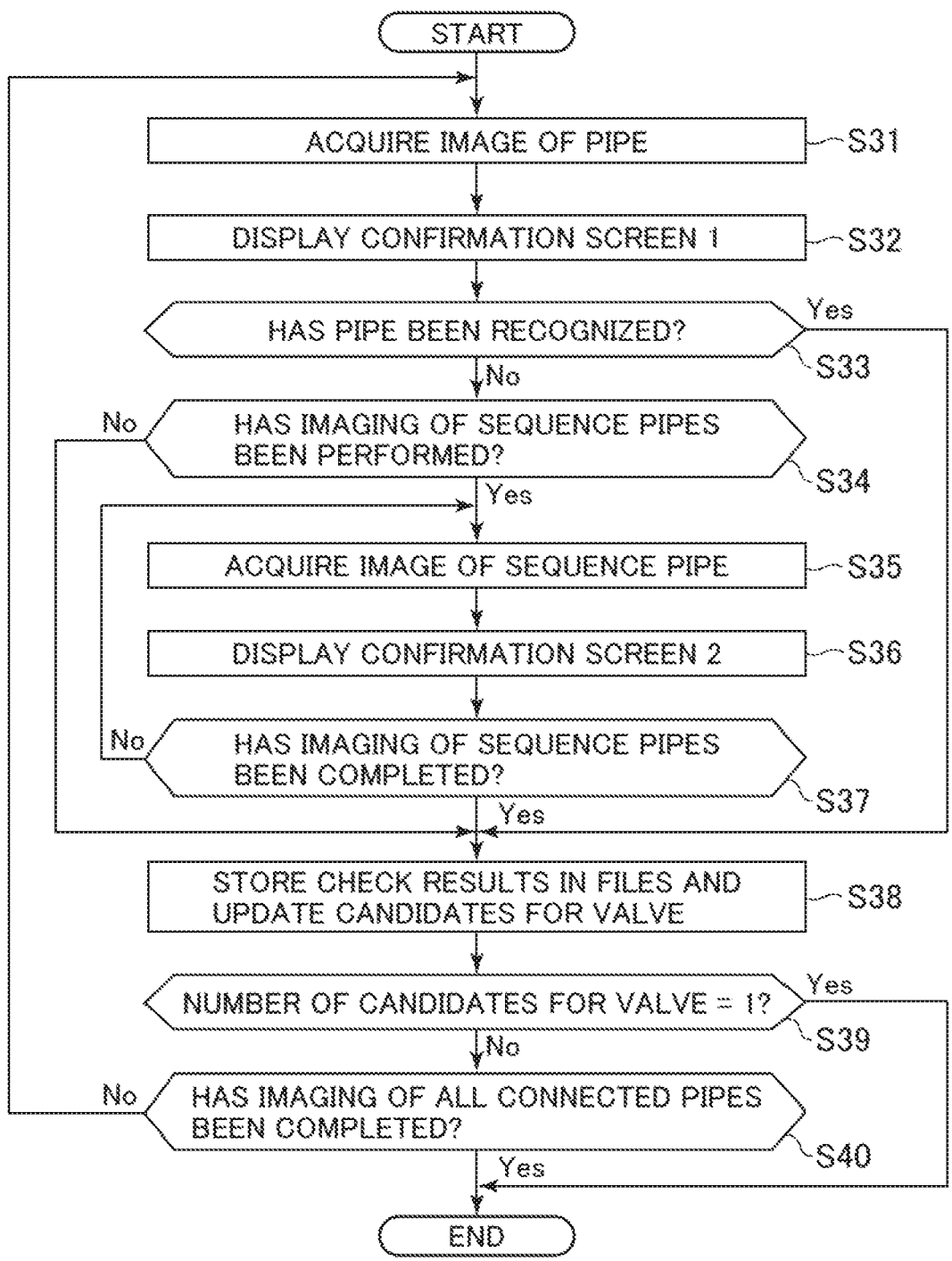
FIG. 7 is a flowchart depicting the flow of a process of recognizing a pipe by a plant facility apparatus recognition system according to a second embodiment of the invention.

FIG. 7 is a flowchart depicting an example of the flow of the process of recognizing a pipe in the plant facility apparatus recognition system according to the second embodiment. FIGS. 8A and 8B are diagrams depicting examples of a confirmation screen in the process of recognizing a pipe. FIG. 9 is a flowchart depicting an example of the flow of the process of recognizing a valve in the plant facility apparatus recognition system according to the second embodiment. FIG. is a diagram depicting an example of a displayed confirmation screen in the process of recognizing a valve.

The process of recognizing a pipe and the process of recognizing a valve in the plant facility apparatus recognition system according to the second embodiment are executed by the processor, which builds the digital system of the mobile device 10 in each of the mobile device 10 of the plant facility apparatus system 1 according to the first embodiment described with reference to FIG. 1 and the mobile device 10 of the plant facility apparatus system 1 according to the second embodiment.

For example, in the case where the pipe 1518 depicted in FIG. 6 is to be subjected to the recognition process, the straight pipe portion 1518_1 directly connected to the valve 1511 is referred to as pipe #1, and the straight pipe portions 1518_2, 1518_3, . . . existing on the downstream side of the pipe #1 are referred to as sequence pipes #1sq1, #1sq2, . . . .

Process of Recognizing Pipe

First, the flow of the process of recognizing a pipe is described with reference to the flowchart of FIG. 7. When the pipe #1 is imaged by the camera 122 in accordance with an operation by the worker, the processor acquires an image of the pipe #1 (in step S31) and causes a confirmation screen 1 depicted in FIG. 8A to be displayed on, for example, the display section 15 of the mobile device 10 (in step S32).

The worker puts a "check mark" on the confirmation screen 1 depicted in FIG. 8A to determine whether a pipe diameter, a pipe length, a pipe height, and pipe orientation (horizontal direction H or vertical direction V) are included in narrowing-down requirements. In this example, the pipe diameter, the pipe length, and the horizontal direction H for which "check marks" are put by the worker are included in the narrowing-down requirements.

Next, the processor determines whether the pipe #1 has been recognized based on the narrowing-down requirements for which the "check marks" have been put by the worker (in step S33). The recognition process may be executed in the recognition process described in the first embodiment. When the pipe #1 is a characteristic pipe, for example, has an exceptionally large diameter or the like, the pipe #1 can be recognized in the determination process of step S33. When the pipe #1 has been recognized, the pipe 1518 connected to the valve 1511 is recognized.

When the pipe #1 or the pipe 1518 has not been recognized in the process of step S33, the sequence pipes #1sq1, #1sq2, . . . connected to the pipe #1 are sequentially imaged by the camera 122 in accordance with an operation by the worker. When the pipe #1 has not been recognized (No in step S33), the processor determines whether the imaging of any of the sequence pipes has been performed (in step S34). When the imaging of the sequence pipe has been performed (Yes in step S34), the processor acquires an image of the sequence pipe (in step S35) and causes a confirmation screen 2 depicted in FIG. 8B to be displayed (in step S36).

Next, the processor determines whether the imaging of the sequence pipes has been terminated (in step S37). When the imaging of the sequence pipes has not been terminated (No in step S37), the processor causes the process to return to step S35 and repeatedly executes the steps S35 and S36. FIG. 8B depicts an example in which pipe diameters, pipe lengths, pipe heights, and pipe orientation (horizontal direction H and the vertical direction V) of the sequence pipes up to the sequence pipe #1sq2 (straight pipe portion 1518_3) are displayed on the confirmation screen 2. The worker puts "check marks" on the confirmation screen 2 to determine whether pipe diameters, pipe lengths, pipe heights, and pipe orientation (horizontal direction H and vertical direction V) are included in narrowing-down requirements for recognizing the sequence pipes #1sq1 and #1sq2, like the case where the confirmation screen 1 is used.

Next, the processor causes check results on the confirmation screen 1 and check results on the confirmation screen 2 to be stored in files with different file names and updates candidates for the valve 1511 (in step S38). When the processor determines that the pipe #1 has been recognized (Yes in step S33) or when the processor determines that the imaging of the sequence pipes has not been performed (No in step S34), the processor causes the process to directly proceed to step S38.

Next, the processor determines whether the number of pipes connected to the valve 1511 is 1 (in step S39). When the number of pipes connected to the valve 1511 is not 1 (No in step S39), the processor determines whether the imaging of all the pipes connected to the valve 1511 has been completed (in step S40). When the imaging of all the pipes connected to the valve 1511 has not been completed (No in step S40), the processor causes the process to return to step S31 and repeatedly executes the aforementioned process of recognizing a pipe. When the candidates for the valve 1511 are narrowed down to one candidate (Yes in step S39) or when the imaging of all the pipes connected to the valve 1511 has been completed (Yes in step S40), the processor terminates the aforementioned process of recognizing a pipe.

Process of Recognizing Valve

Next, the flow of the process of recognizing a valve is described with reference to the flowchart of FIG. 9. The processor acquires the number, entered by the worker, of pipes connected to the valve 1511 (in step S41). In this example, 3 that is the number of pipes connected to the valve 1511 and is clarified from FIG. 6 is entered by the worker.

Next, the processor selects desired files or the latest files from among the result files updated in step S38 (in step S42) and causes a confirmation screen 3 to be displayed (in step S43). As depicted in FIG. 10, multiple candidates similar to the pipes connected to the valve 1511 are displayed as the result files on the confirmation screen 3. In this example, two candidates #1_1 and #1_2 are displayed for a result file of the pipe #1, and two candidates #2_1 and #2_2 are displayed for a result file of the pipe #2. A single candidate is displayed for a result file of the pipe #3.

The worker puts "check marks" on the confirmation screen 3 to determine whether details of the result files are added to requirements for outputting a list. Thus, the worker corrects data for the details of the result files by putting "check marks". Specifically, the worker confirms narrowing-down requirements on the confirmation screen 3.

Next, the processor updates the files for the result file details for which the data has been corrected (in step S44). Then, the processor outputs narrowing-down results as a valve list (list of candidates for the plant facility apparatus) (in step S45).

As described above, when the pipe to be subjected to the identification process includes one or multiple bent pipe portions, not only the straight pipe portion 1518_1 directly connected to the valve 1511 but also the straight pipe portions existing on the downstream side of the straight pipe portion 1518_1 are subjected to the matching, and the identification rate of the pipe 1518 can be improved. As a result, the identification rate of the valve that is an example of the plant facility apparatus can be improved.

In the first and second embodiments, as second characteristic lengths that are comparative characteristic lengths, the pipe information such as the diameters, lengths, heights, and orientation (horizontal direction H and vertical direction V) of the pipe is exemplified, but is not limited to this. For example, identification information such as line numbers given to the pipe (straight pipe portions and bent pipe portions) may be used as second characteristic lengths to identify the pipe. In this case, the identification information such as the line numbers is read using a known character recognition technique and the pipe is identified from results of the reading. In the second embodiment, information such as the number of straight pipe portions and the number of bent pipe portions may be used as second characteristic lengths.

Third Embodiment

Figure 11:
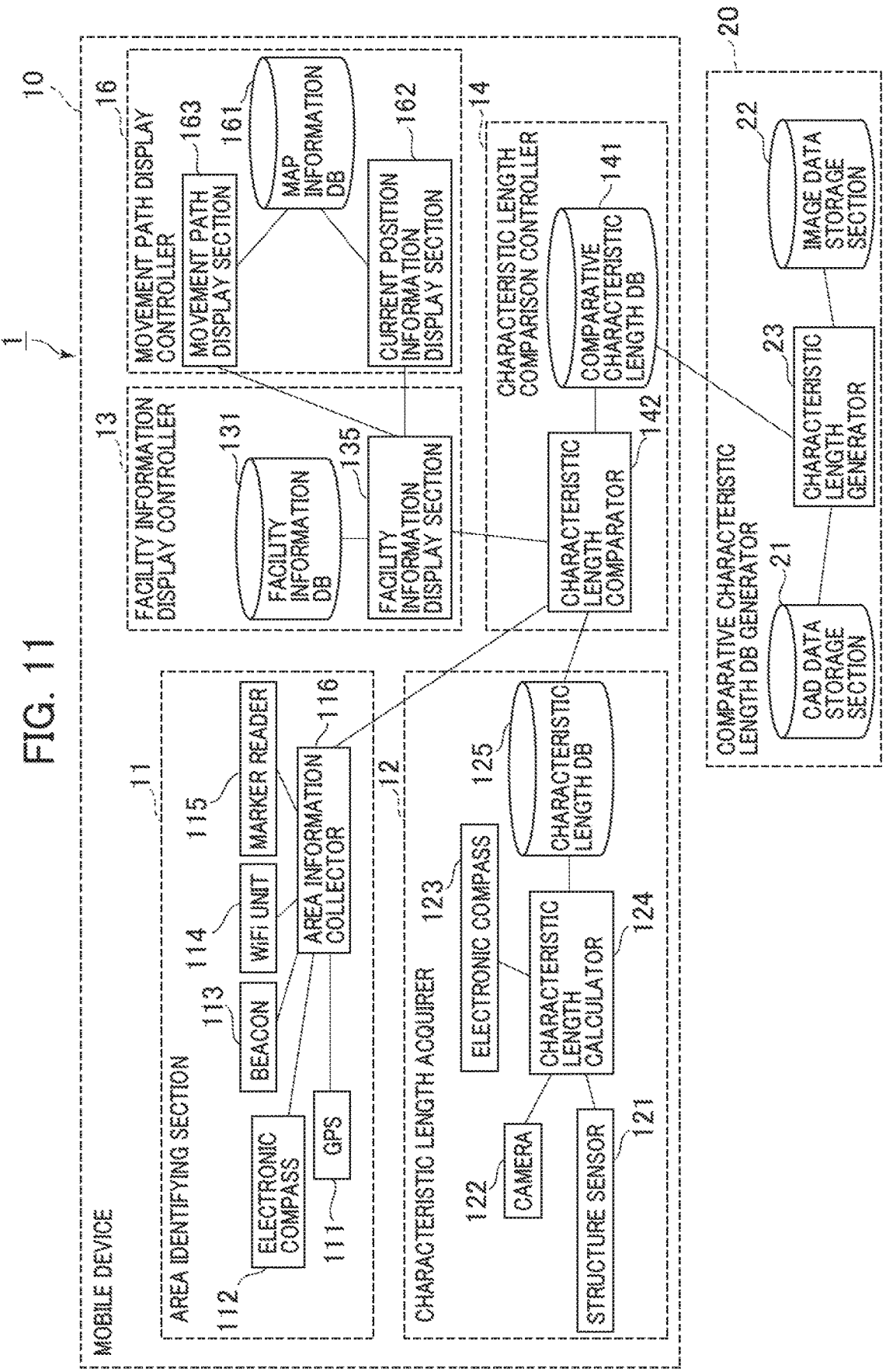
FIG. 11 is a block diagram depicting an example of a configuration of a plant facility apparatus recognition system according to a third embodiment of the invention.

A third embodiment is an example in which the plant facility apparatus recognition system according to the first embodiment or the plant facility apparatus recognition system according to the second embodiment is used as a navigation system that does not use a wireless technique. A plant facility apparatus recognition system according to the third embodiment is described with reference to FIG. 11. FIG. 11 is a block diagram depicting an example of a configuration of the plant facility apparatus recognition system according to the third embodiment of the invention.

In the plant facility apparatus recognition system according to the first or second embodiment, plant facility apparatuses are narrowed down by effects of the characteristic acquirer 12 and the characteristic length comparison controller 14 to the plant facility apparatus to be subjected to the work. Then, the facility information display controller 13 acquires, from the facility information database 131, the facility information including the work instruction detail of the plant facility apparatus to be subjected to the work, and the facility information is displayed on the facility information display section 135.

Specifically, according to the plant facility apparatus recognition system according to the first or second embodiment, since installation positions of the pipes and the plant facility apparatuses are known in advance, the current position of the mobile device 10 can be identified. Thus, for example, the worker wears a wearable device, which is an example of the mobile device 10, and moves while the wearable device identifies pipes existing around the wearable device after an entry in the area (plant facility) in which the plant facility apparatus is installed. Thus, the wearable device can acquire information of a movement path extending from an entrance of the area to the current position.

The plant facility apparatus recognition system 1 according to the third embodiment includes the area identifying section 11, the characteristic length acquirer 12, the facility information display controller 13, the characteristic length comparison controller 14, and a movement path presenting section 16 that serves as one of functional sections of the mobile device 10 and is configured to present the movement path, extending from the entrance of the area to the current position of the mobile device 10, of the mobile device 10.

The movement path presenting section 16 includes a map information database 161, a current position display section 162, and a movement path display section 163. The map information database 161 is a database of map information of the inside of the area (plant facility) in which the plant facility apparatus is installed. Specifically, the map information database 161 is a database of information of installation positions of the pipes and the plant facility apparatus and passages. The current position display section 162 and the movement path display section 163 are display sections of the mobile device 10 and display the current position of the mobile device 10 and the movement path, respectively.

As described above, in the third embodiment, the technique for identifying the current position of the mobile device 10 from the installation positions of the pipes and the plant facility apparatus in the first embodiment is used to display the current position of the mobile device 10 and display the movement path extending from the entrance of the area to the current position. In addition, the movement path presenting section 16 may store and hold the movement path extending from the entrance of the area to the current position.

By updating the current position of the mobile device 10 in real time and recognizing the current position of the mobile device 10, the plant facility apparatus recognition system 1 according to the third embodiment can be used as a mobile navigation system that does not use a wireless technique. In other words, the plant facility apparatus recognition system 1 according to the third embodiment may have a mobile navigation function.

For example, when there is an impassable site through which the worker is not able to move due to construction, a material yard, or the like, the worker moves while avoiding the impassable site. Thus, the movement path presenting section 16 may have a function of storing and holding the movement path of the mobile device 10, estimating the impassable site from the movement path stored and held, and presenting a movement path not extending through the impassable site. Thus, the movement path presenting section 16 can estimate the impassable site upon a next movement and present the movement path not extending through the impassable site.

Modified Examples

The invention is not limited to the aforementioned embodiments and includes various modified examples. For example, the embodiments are described above in detail to clearly explain the invention, and may not necessarily include all the configurations described above. For example, the functional sections depicted in FIGS. 1 and 11 may be enabled by software or may be enabled by hardware or by designing a portion or all of the functional sections using an integrated circuit.

The aforementioned embodiments exemplify the valve connected to the pipes as the plant facility apparatus, but the invention is not limited to the valve and is applicable to facility apparatuses connected to pipes or a motor connected to a pipe and the like.

What is claimed is:

1. An apparatus recognition system that uses a mobile device having a camera to recognize an apparatus to be subjected to work in a facility, comprising:
    characteristic length acquirer that acquires information on a pipe as a first characteristic length from an image obtained by using the camera to image the apparatus to be subjected to the work and the pipe existing near the apparatus, wherein
        the mobile device is configured to compare the first characteristic length with a second characteristic length acquired from design data and related to the pipe; and
    a facility information display section that displays, based on a result of the comparison, information on the pipe and facility information of the apparatus, which is to be subjected to work, wherein
        apparatuses are narrowed down to a list of candidate apparatuses including the apparatus based on the information on the pipe.

2. The apparatus recognition system according to claim 1, wherein
    the facility information includes a work instruction detail related to the apparatus to be subjected to the work.

3. The apparatus recognition system according to claim 1, further comprising:
    a database including, as the second characteristic length, a diameter of the pipe within the facility, a length of the pipe, and a distance from a floor or a wall to the pipe.

4. The apparatus recognition system according to claim 3, wherein
    the database further includes, as the second characteristic length, a positional relationship between the apparatus to be subjected to the work and the pipe.

5. The apparatus recognition system according to claim 3, wherein
    the database further includes, as the second characteristic length, a positional relationship between pipes within the facility.

6. The apparatus recognition system according to claim 1, wherein
    the pipe includes one or multiple straight pipe portions and a bent pipe portion,
    the apparatus recognition system further comprises a database including, as the second characteristic length, a diameter of each of the one or more straight pipe portions, a length of each of the one or more straight pipe portions, and a distance from a floor or a wall to each of the one or more straight pipe portions.

7. The apparatus recognition system according to claim 1, further comprising:
    an augmented reality (AR) display section that estimates an image captured by the camera from positional information, obtained by identifying the pipe and the apparatus within the facility, of the mobile device and orientation information, obtained by a compass installed in the mobile device, of the mobile device and superimposes and displays a three-dimensional image of the apparatus on the image captured by the camera.

8. The apparatus recognition system according to claim 1, wherein
    the facility information display section displays information on a structural object existing near the mobile device based on positional information, obtained by identifying the pipe and the apparatus within the facility, of the mobile device.

9. The apparatus recognition system according to claim 8, wherein the apparatus recognition system is also configured to present a movement path of the mobile device by updating, in real time, the positional information, obtained by identifying the pipe and the apparatus within the facility, of the mobile device.

10. The apparatus recognition system according to claim 9, wherein
    the movement path presenting section stores and holds the movement path of the mobile device, estimates an impassable site from the movement path stored and held, and presents a movement path not extending through the impassable site.

11. An apparatus recognition method for using a mobile device having a camera to recognize an apparatus to be subjected to work in a facility, comprising:

acquiring information on a pipe as a first characteristic length from an image obtained by using the camera to image the apparatus to be subjected to the work and the pipe existing near the apparatus;

comparing the first characteristic length with a second characteristic length acquired from design data and related to the pipe; and displaying, using a facility information display section, and based on a result of the comparison, information on the pipe and facility information of the apparatus, which is to be subjected to work, wherein apparatuses are narrowed down to a list of candidate apparatuses including the apparatus based on the information on the pipe.

* * * * *